United States Patent [19]

Rossetti

[11] 4,068,977
[45] Jan. 17, 1978

[54] TAPPING HEAD
[76] Inventor: Attilio Rossetti, Via Verdi, 2, San Benedetto Po (Mantova), Italy
[21] Appl. No.: 707,784
[22] Filed: July 22, 1976
[30] Foreign Application Priority Data
July 28, 1975 Italy ................................ 18109/75
[51] Int. Cl.$^2$ ............................ B23G 1/52; B23G 5/12
[52] U.S. Cl. .................................. 408/177; 10/96 T
[58] Field of Search ............... 408/173, 174, 175, 176, 408/177, 120, 123; 10/96 T

[56] References Cited
U.S. PATENT DOCUMENTS
1,422,222 7/1922 Nonneman ........................... 408/174
2,058,909 10/1936 Phillips ............................... 408/177
2,491,458 12/1949 Sternbergh ..................... 408/176 X Primary Examiner—Z. R. Bilinsky
Attorney, Agent, or Firm—Guido Modiano; Albert Josif

[57] ABSTRACT

A tapping head with chasers of different pitches is described. The head comprises a block in the form of a hollow cylinder with a plurality of radial grooves in which chasers of different pitches are movable. The tapping head constitutes the main component of a tool usable both in manual and in machine threading with which it is possible to work a plurality of diameters involving at least two different pitches and reducing the preparation time to a minimum.

1 Claim, 1 Drawing Figure

U.S. Patent    Jan. 17, 1978    4,068,977
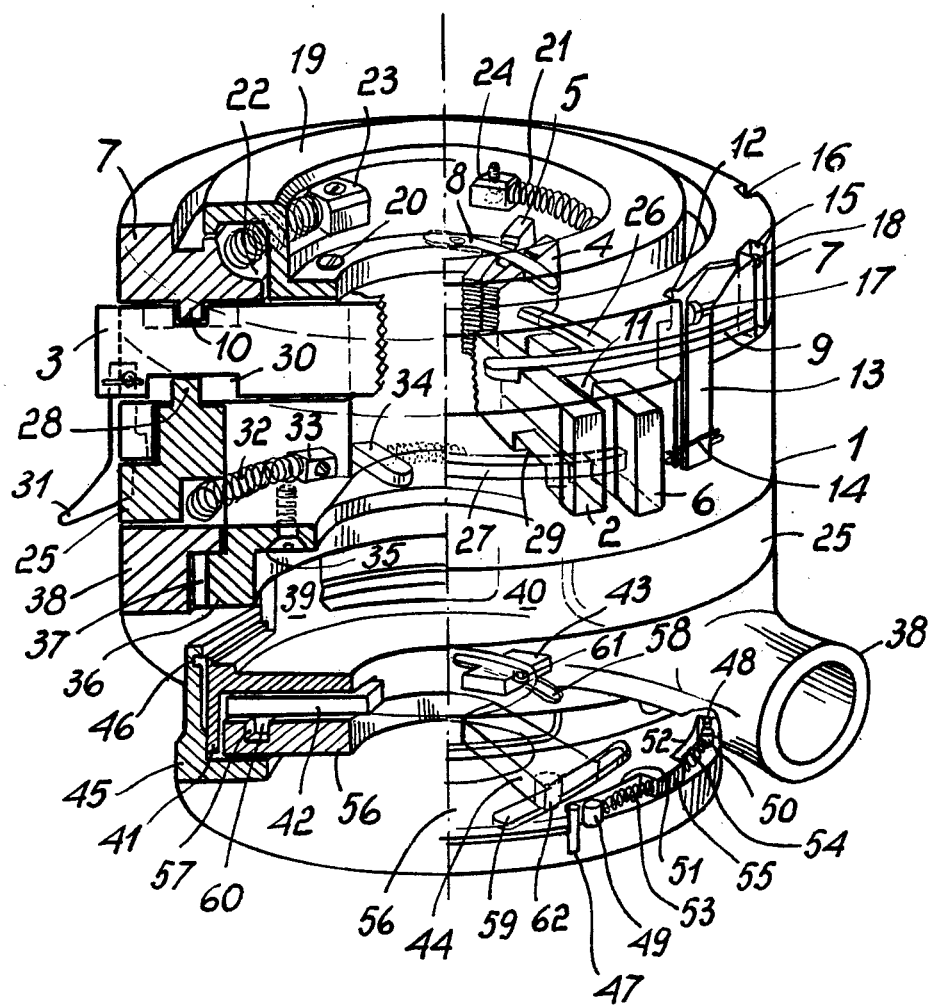

TAPPING HEAD

BACKGROUND OF THE INVENTION

When installing hydraulic systems, the installers are continuously required to thread pipes for sleeve and socket connections. As the pipe diameter changes, the thread pitch changes in accordance with the following series (which includes only the most usual diameters):

for diameters of ¼ inch and ⅜ inch the pitch is 19 threads per inch;

for diameters of ½ inch and ¾ inch the pitch is 14 threads per inch;

for diameters of 1 inch, 1¼ inch, 1½ inch, 2 inch and up to 6 inch, the pitch is 11 threads per inch.

At present, the aforementioned threads are constructed using threading dies provided with cutting components known as chasers. These threading dies are supplied in sets to the installers and each die can only be used for one diameter. Threading dies are also available in which the position of the chasers is adjustable, so that all diameters of the same pitch can be worked, however the chasers must be changed if diameters of a different pitch are to be worked.

It is therefore apparent that even today large supplies of tool components and considerable wastage of time are involved in threading operations whenever it is required to change the working diameter.

SUMMARY OF THE INVENTION

The object of the invention is to provide a tool component usable both in manual and in machine threading, with which it is possible to work a plurality of diameters involving at least two different pitches, and reducing the preparation time to a minimum.

A further object of the invention is to provide a compact tool component to eliminate the possibility of loss of component parts.

These objects are attained by a tapping head with chasers of different pitches, comprising a block in the form of a hollow cylinder with a plurality of radial grooves provided one close to the other at least in pairs, and in which chasers of different pitches are movable, the block therefore being provided with at least two groups of chasers of different pitches, the chasers of one of these groups each being provided with a groove on the side facing one base of the block, and the chasers of the other group each comprising an analogous groove on the side facing the other base of the block, and further comprising a respective operating ring nut for each group of chasers, rotatable relative to the block and comprising cams which penetrate into the latter grooves and are constructed such that when the operating ring nut is rotated through a certain angle they cause radial advancement of the relative group of chasers for threading a determined diameter, and further comprising guide and support devices for the pipe to be worked while constructing the thread, and devices for rotating the block to apply pipe cutting motion by the chasers.

BRIEF DESCRIPTION OF THE DRAWING

These and further operational and constructional characteristics of the invention will be more evident from the detailed description given hereinafter of a preferred but not exclusive embodiment of a manually operable tapping head comprising for example two pluralities of three respective chasers of different pitches for threading two respective diameters for each plurality of chasers, the description being given with reference to the accompanying drawing which shows the tapping head according to the invention half in section on a diametrical plane and half as a transparent full view.

DESCRIPTION OF THE PREFERRED EMBODIMENTS

The drawing shows a tapping head block 1 in the form of a hollow cylinder and comprising radial grooves into which for example three pairs of indexable chasers are inserted. As visible in the drawing the chasers are arranged over a circumferential array and extend radially thereto. Of these pairs, the chasers 2, 3 and 4 can thread at one determined pitch and the chasers 5, 6 and a third chaser associated with the chaser 3 but not visible in the drawing can thread at a different pitch. Preferably the chasers of larger pitch are disposed to the front of the chasers of smaller pitch in the cutting direction, to facilitate discharge of the shavings when threading with the subsequent chasers which penetrate further towards the axis in threading the smaller diameters. An adjusting ring nut 7 rotatably disposed on the block 1 is provided with three cams 8, 9 and 10, of which the cams 8, 9 are visible in transparent full view and the cam 10 is visible in section. The cams are in the form of arcuated ribs and are inserted in grooves provided on the chasers 2, 3 and 4, and are constructed in such a manner that when operated manually by rotating the adjusting ring nut 7 in the anticlockwise direction in relation to the block 1, they cause the radial advancement of the three chasers towards the interior. The three chasers of pitch different from the pitch of the chasers 2, 3 and 4 are provided with wide discharge grooves such as the groove 11 for the chaser 6, so that the cams 8, 9 and 10 do not obstruct the chasers.

In the drawing, the chasers 2, 3 and 4 are shown in the position of maximum advancement for threading the smallest diameter, their exact position being determined by rotating the adjusting or indexing ring nut 7 until the indexing notch 12 reaches the region of the reference element or click member 13, this latter being connected articulatedly by its lower end to the block 1 and pressed into the inserted position shown in the drawing by a spring 14. The adjusting ring nut 7 is provided with two further indexing notches 15 and 16, disposed in such a manner that when the reference element 13 is inserted in the notch 15, the chasers 2, 3 and 4 are in the position of advancement in which the largest diameter is threaded, while when the element 13 is inserted into the notch 16, the chasers are in the rest position. The notches 12 and 15 are provided with threaded adjustment dowels 17, 18 for exactly positioning the chasers. It will be appreciated that the click member 13 and the dowels 17, 18 act as locking means for the selected position of the ring nut 7.

The adjusting ring nut 7 is kept in its position by the cover ring 19, which is fixed to the block 1 by screws 20. In the arcuated cavity 22 formed by the walls of the adjusting ring nut 7 and cover 19 there is disposed at least one spring 21, the ends of which rest on the small block 23 fixed to the adjusting ring nut 7 and the small block 24 fixed to the cover 19 respectively, so that the spring becomes preloaded when rotating the adjusting ring nut 7 in moving the chasers into their working position, so that the adjusting ring nut 7 returns rapidly when the chasers are again to be moved into their rest position.

Below the block 1 there is disposed an adjusting ring nut 25 provided with three cams 26, 27, 28, of which the cams 26 and 27 are visible in full transparent view and the cam 28 in section. The cams penetrate into grooves provided in the chasers 5, 6 visible in the drawing and in the unillustrated chaser associated with the chaser 3, in such a manner that they cause the three chasers to move radially towards the interior on rotating the adjusting ring nut 25 in the anticlockwise direction relative to the block 1, The chasers 2, 3 and 4 are provided with wide grooves on the side facing the adjusting ring nut 25, such as the groove 29 for the chaser 2 and the groove 30 for the chaser 3, so that the cams 26, 27 and 28 do not obstruct the chasers.

Preferably the cams of one adjusting ring nut, for example the adjusting ring nut 7, are of right handed development and the cams of the other adjusting ring nut 25 are of left handed development, so that the chasers return to the rest position for both groups of chasers by rotating the relative adjusting ring nuts in the same direction.

In the drawing the chasers 5 and 6 are shown in the rest position, and the reference element or click member 31 articulatedly connected to the block 1 is inserted into a corresponding notch (not shown on the drawing), which is provided in the adjusting or indexing ring nut 25, this latter being provided with two further indexing notches not shown on the drawing, the purpose of which is to create, in the manner of the indexing notches 15 and 16 of the adjusting ring nut 7, the reference point for the correct setting of the adjusting ring nut 25 for threading two different diameters by the chasers 5, 6 and the third chaser, not shown. The click member 31 and the cooperating parts thereof are otherwise identical to the spring biased click member 13 so that additional description thereof may be omitted, the reference to the description of click member 13 being sufficient.

At least one spring 32 resting on a small block 33 fixed to the adjusting ring nut 25 and on a small block 34 fixed in a cavity in the block 1 is preloaded on rotating the adjusting ring nut 25 for advancing the chasers into their working position, so causing the adjusting ring nut 45 to return rapidly when it is required to replace the chasers in their rest position.

A cover 36 is fixed on the block 1 by screws, for example the screw 35, an is provided with teeth 37 for its entrainment by a ratchet device 38 operated in the usual manner for supplying the cutting motion to the chasers.

The cover 36 is provided with projections 39 and 40 which support the ring 41, which comprises three radial grooves in which three prismatic elements 42, 43 and 44 slide, the purpose of these latter being to maintain the exact mutual positioning of the pipe and tapping head during the thread cutting. These elements are advanced by rotating a ring nut 45 (which is kept in its position by the Seeger ring 46) by means of a unidirectional device consisting of the pins 47 and 48 inserted in the ring nut 45, rollers 49, 50 free to slide in contact with the contours 51 and 52, and springs 53 and 54 supported on a tooth 55 of the disc 56. This device rotates the disc 56 and is provided with cams 57, 58 and 59 in which the pins 60, 61, 62 of the elements 42, 43, 44 are guided.

The invention is subject to various modifications without leaving the scope of the inventive idea, and all individual parts may be replaced by technically equivalent parts.

I claim:

1. A tapping head having at least two groups of indexable chasers of different pitches, arranged over a circumferential array and radially extending thereto, comprising a block in the form of a hollow cylinder block, radial grooves in said cylinder block for slidably receiving therein said chasers, the chasers of a first of said groups having each a groove on a side thereof facing one end of said cylinder block and the chasers of a second of said groups having each a second groove on an opposite side thereof facing a first ring nut coaxially arranged near said one end of said hollow cylinder block and circumferentially slidable therein, said first ring nut having cam means in the form of an arcuated rib projecting from a surface thereof facing said side of the chasers of said first group thereof and engaging said grooves thereof to radially shift said first group chasers during rotation of said first ring nut, said first ring nut having transverse indexing notches on an outside peripheral surface thereof for positioning said first ring nut in operative positions thereof defined by said notches and first locking means on said cylinder block, for locking said first ring nut in a selected operative position, said first locking means comprising a first click member hinged on said cylinder block and first spring means urging said first click member in selective engagement with one of said first notches when the selected first notch is brought in the reach of said first click member during indexing of said first ring nut and a first threaded adjustment dowel for exact angular positioning of said first ring nut, a shaped cover ring superposed on said first ring nut independently thereof and fixed on said cylinder block, said shaped cover ring and said first ring nut defining an arcuated cavity therebetween, spring means within said arcuated cavity and having one end thereof rigid with said first ring nut an another end thereof rigid with said cover ring to urge said first ring nut in a rest position thereof, a second ring nut concentric with said hollow cylinder block and arranged slidably thereon remote from said first ring nut, said second ring nut having second cam means in the form of an arcuated rib projecting from a surface thereof facing said opposite side of the second group chasers and engaging said second grooves thereof to radially shift said second group chasers during rotation of said second ring nut, said second ring nut having second transverse indexing notches on an outside peripheral surface thereof for positioning said second ring nut in operative position thereof defined by said second notches and second locking means on said cylinder block remote from said first locking means for locking said second ring nut in a selected operative position thereof, said second locking means comprising a second spring biased click member hinged on said cylinder block and urged in selective engagement with one of said second notches when the selected second notch is brought in the reach of said second click member during indexing of said second ring nut, a circumferential recess at the inside periphery of said second ring nut member, a second spring means within said circumferential cavity and having one end thereof rigid with said second ring nut and the other end thereof rigid with said hollow cylinder block to urge said second ring nut member in a rest position thereof, self centering guide and support devices for the pipe to be worked while cutting the thread therein and devices for rotating the cylinder block to impart cutting motion to the chasers.

* * * * *